(12) United States Patent
Jessenberger

(10) Patent No.: US 6,189,657 B1
(45) Date of Patent: Feb. 20, 2001

(54) LINEAR MOTOR FOR DRIVING A LIFT CAR

(75) Inventor: Ralf Jessenberger, Leinfelden (DE)

(73) Assignee: Thyssen Aufzugswerke GmbH, Neuhausen (DE)

( * ) Notice: Under 35 U.S.C. 154(b), the term of this patent shall be extended for 0 days.

(21) Appl. No.: 09/374,632

(22) Filed: Aug. 16, 1999

Related U.S. Application Data

(63) Continuation of application No. PCT/EP98/00641, filed on Feb. 6, 1998.

(30) Foreign Application Priority Data

Feb. 17, 1997 (EP) .................................................. 97102505

(51) Int. Cl.[7] .................................................. B66B 1/06
(52) U.S. Cl. .................................................. 187/289
(58) Field of Search .................. 187/293, 295, 187/289; 312/135, 687; 310/12

(56) References Cited

U.S. PATENT DOCUMENTS

| | | |
|---|---|---|
| 4,924,128 | 5/1990 | Vaillant de Guelis et al. . |
| 5,141,082 * | 8/1992 | Ishii et al. ........................ 187/110 |
| 5,174,416 * | 12/1992 | Sakabe et al. ..................... 187/17 |
| 5,183,980 | 2/1993 | Okuma et al. . |
| 5,225,725 | 7/1993 | Shiraki et al. . |
| 5,235,145 | 8/1993 | Olsen et al. . |
| 5,393,941 * | 2/1995 | Mizuno et al. ................... 187/293 |
| 5,547,059 * | 8/1996 | Watanabe et al. ................ 187/289 |
| 5,579,869 * | 12/1996 | Ishii et al. ........................ 187/289 |
| 5,736,693 * | 4/1998 | Peich et al. ...................... 187/316 |
| 5,751,076 * | 5/1998 | Zhou ................................... 310/12 |
| 5,841,082 * | 11/1998 | Rivera et al. .................... 187/316 |

FOREIGN PATENT DOCUMENTS

| | | |
|---|---|---|
| 94 02 427 U | 7/1994 | (DE) . |
| 0 556 595 | 8/1993 | (EP) . |
| 0 509 647 | 10/1994 | (EP) . |

* cited by examiner

Primary Examiner—Jonathan Salata
(74) Attorney, Agent, or Firm—Barry R. Lipsitz

(57) ABSTRACT

A linear motor for lifts for driving a lift car guided in a lift shaft with at least one stator winding row which can be fixed to the lift shaft or to the lift car and with at least one row of exciter magnets of alternating polarity which are situated opposite the stator windings at a distance and which can be fixed to the lift car or the lift shaft, respectively, in such a way that the linear motor exerts only small transverse forces on the motor support and also operates as noiselessly as possible and is easy to assemble, wherein that the stator windings are of iron-free design and are disposed between two mutually oppositely situated exciter magnet rows. In addition, a lift having a lift car which can be driven in a lift shaft wherein the lift has a linear motor of this type for driving the lift car.

22 Claims, 4 Drawing Sheets

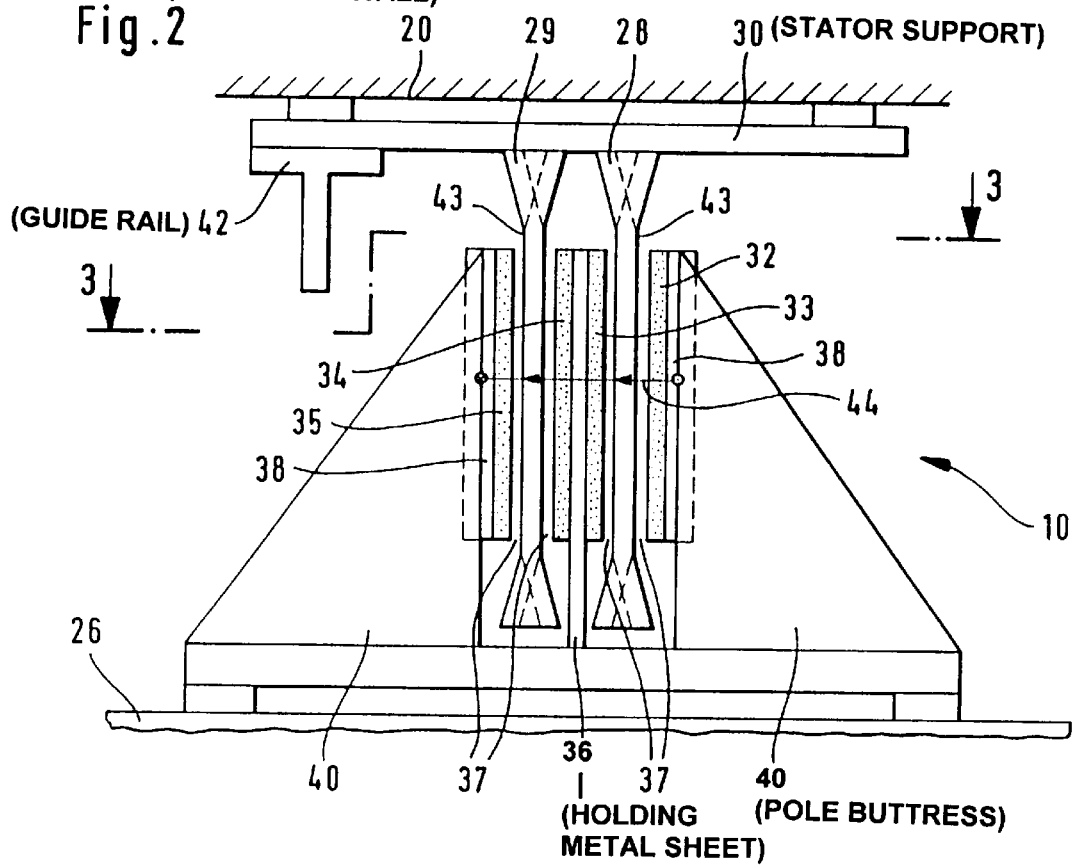
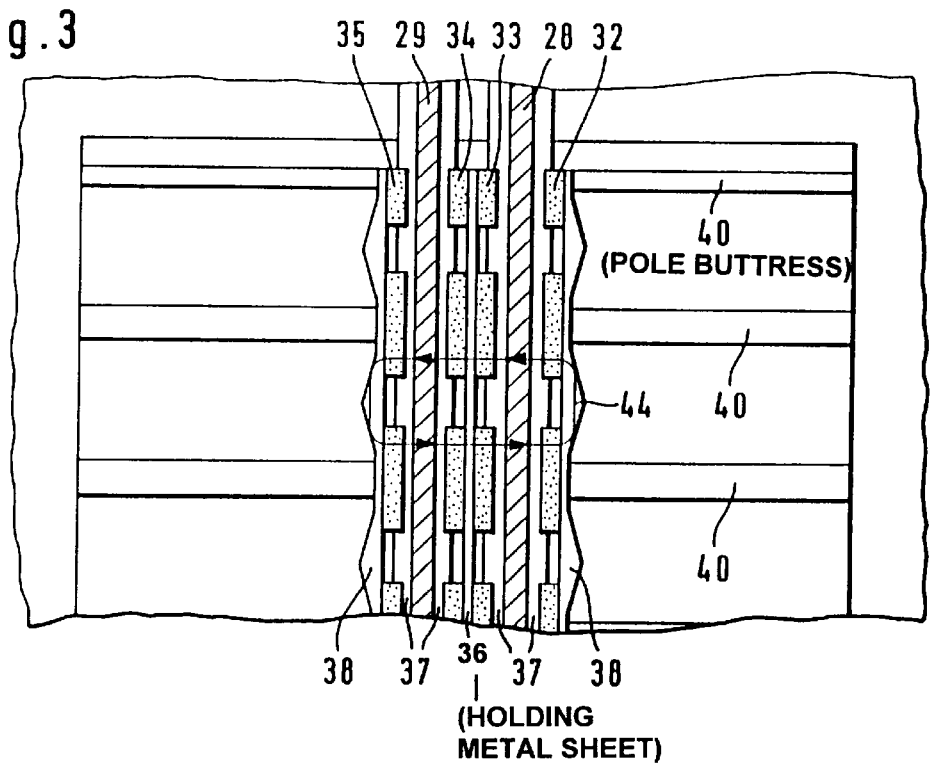

LINEAR MOTOR FOR DRIVING A LIFT CAR

This application is a continuation of PCT International Application Ser. No. PCT/EP98/00641 filed on Feb. 6, 1998.

BACKGROUND OF THE INVENTION

The present disclosure relates to the subject matter disclosed in international application PCT/EP 98/00641 of Feb. 6, 1998, the entire specification of which is incorporated herein by reference.

The present invention relates to a linear motor for lifts for driving a lift car guided in a lift shaft, having at least one stator winding row which can be fixed to the lift shaft or on the lift car and having at least one row of exciter magnets of alternating polarity which are situated opposite the stator windings at a distance and can be fixed to the lift car or on the lift shaft, respectively.

The invention relates, in addition, to a lift having a lift car which can be driven in a lift shaft.

Lifts in very high buildings should achieve high carrying capacities with as small space requirement as possible. This requirement can be fulfilled in that a multiplicity of lift cars are propelled at high velocities with low lift car weight in a lift shaft. However, a necessary condition for this is that the lift cars are driven directly without cable. Because of the considerably reduced mass during an empty journey, there is, in particular, the possibility of propelling empty lift cars at high velocity and with high acceleration and, consequently, of reducing the waiting time appreciably.

The linear motor mentioned at the outset, in particular, is suitable for the direct drive of a cable-free lift, the stator windings, which form the primary coils of the linear motor, normally being mounted on a wall of the lift shaft and the exciter magnets on the lift car. The condition imposed on the linear motor is that it has a beneficial efficiency and should load the lift car and the lift shaft wall with as little inherent mass and transverse forces as possible.

In addition, the noise developed by the linear motor is a particular problem, especially if the motor is fixed directly to the lift car. In this connection, noise and vibration are predominantly caused by grooving harmonics, by magnetostriction and by time-variable magnetic forces during the journey. Since a direct drive for lifts should have at least the same travelling characteristics and the same low noise level in the lift car as conventional high-quality cable lifts, the requirement is imposed on the linear motor drive of lifts, in particular, to generate as little vibration and noise as possible.

European Published Specification EP 0 556 595 A1 describes a passenger carrying system for very high buildings in which lift cars are used which are directly driven by means of a linear motor. The lift cars can be propelled not only in the vertical direction along the lift shaft, but additionally also in the horizontal direction by a mechanical device. Consequently, a change from one lift shaft to an adjacent lift shaft is possible, as a result of which a high carrying flow can be achieved if the change takes place very quickly. The lift car is driven with the aid of a synchronous long stator which is mounted flatly on the shaft rear wall. The corresponding exciter field is attached to the rear wall of the lift car.

A further lift driven by a liner motor is disclosed in European Patent Specification EP 0 509 647 B1. In order to achieve a high carrying capacity, said publication proposes to install in a circular manner four lift shafts and two empty shafts in total, two lift shafts being used for the upward journey and the other two for the downward journey in each case. Each shaft pair comprises in turn a local and an express track, and in a few storys, mechanical devices are provided in order to interchange the lift cars between the local and express tracks. The linear motor drive described in said European patent specification also comprises stator coils attached to the shaft rear wall and exciter magnets situated opposite the latter via an air gap and disposed on the rear wall of the lift car.

Both in the case of the passenger carrying system described in European Published Specification EP 0 556 595 A1 and in the case of the lift described in the abovementioned European patent specification, high forces of attraction act between exciter and stator and, consequently, high forces act on the lift car and on the wall of the lift shaft as a result of the design of the linear motor. This makes necessary a very robust construction of the lift car and of the attachment of the stator to the lift wall, as a result of which the mass of the lift cabin is in turn appreciably increased. In order to maintain the air gap necessary for the functioning of the linear motor between stator and exciter, at least the exciter has to be provided with spacing rollers which are mounted on the rear wall of the lift car. Because of the high contact pressure of the spacing rollers, severe vibration has to be expected. High travelling velocities are therefore only achievable to a limited extent for this reason.

A further linear-motor-driven lift system is disclosed in U.S. Pat. No. 5,183,980. A synchronous long stator and also an exciter field formed by means of permanent magnets are likewise used in the case of this lift system. On both sides, the exciter field is mounted on two metal sheets projecting from side walls of the lift car situated mutually opposite. The propulsion force is generated by four stator coils in total. The lift car is guided inside the lift shaft with the aid of the so-called zero flux method. This makes use of the effect that a displacement of the lift car in the horizonal direction perpendicularly or parallel to the laterally projecting metal sheets produces an alteration in the magnetic flux through the stator coils as a result of which the position of the lift car can in turn be corrected.

Said zero flux method has, however, the disadvantage that the guide forces necessary to guide the lift car are produced only when the lift car is travelling so that, when the lift car is stationary and when it is travelling slowly, the parts of the linear motor have to be held in a central position by heavily loaded guide rollers immediately adjacent to the linear motor and disposed on suitably robust guides. In addition, it has been found that, in the case of the linear-motor-driven lift system disclosed in U.S. Pat. No. 5,183,980, a good efficiency can be achieved only if the magnetic field strength in the air gap is high and, for this purpose, stator metal sheets for guiding the magnetic field are necessary on the side of the stator coils over the entire transportation height of the lift car. During the passage of the lift car and the exciter magnets mounted thereon, the stator metal sheets situated mutually opposite are exposed to strong dynamic forces of attraction. This results in a high loading of the entire stator construction and attachment and requires suitable measures for avoiding structure-born noise. In addition, the inherent weight of the stator metal sheets extending over the entire lift shaft length requires a very robust construction of the lift shaft.

SUMMARY OF THE INVENTION

The object of the present invention is to design a linear motor for lifts of the generic type in such a way that it exerts only low transverse forces on the motor supports and also operates as noiselessly as possible and is easy to install.

This object is achieved according to the invention in the case of a linear motor for lifts of the type mentioned at the outset in that the stator windings are of iron-free design and are disposed between two exciter magnets rows situated mutually opposite. The stator windings consequently project into a gap between mutually adjacent exciter magnets so that they are mutually opposite one exciter magnet row in each case across an air gap on both sides. As the result of such an arrangement, the horizontal transverse forces which occur in the case of an off-center position of the coils in the air gap are kept very low and this has in turn the result that, while the lift car is travelling, virtually no dynamic transverse loadings act on the lift car, the motor mounting and/or the lift car roller guide. The stator windings are of iron-free design, i.e. they do not have, in particular, any magnetic metal-sheet parts for the field guidance. Such field guides are unnecessary in the case of the design according to the invention owing to the two-sided arrangement of exciter magnet rows, since, as a result, the magnetic field can pass essentially perpendicularly through the stator windings. Because of the iron-free design of the stator windings, the magnetic field cannot be altered with time as a result of the movement of the lift car and this has in turn the result that virtually no vibrations or structure-borne noise are produced at the lift car or at the lift shaft wall.

The design according to the invention has, in addition, the advantage that, as a result of the elimination of the stator metal sheets normally needed, the inherent weight of the stator windings can be kept lower than hitherto usual and the loadings due to the inherent mass of the linear motor according to the invention are therefore markedly lower than in the case of constructions hitherto disclosed. Noise generated by magnetostriction is also virtually absent. In addition, the supporting structure for the exciter section situated opposite the stator windings on both sides can be designed with lower weight than in the prior art since only static forces of attraction occur between the exciter magnet rows situated mutually opposite and receiving the stator windings between them.

In addition, the construction according to the invention makes it possible easily to install a cable-free drive retrospectively in an existing lift shaft since the stator windings have only a relatively low inherent weight and, for given static requirements, can therefore be attached, for example, to the existing shaft walls. As a result, more than one lift car can travel in the lift shaft for the same shaft cross-sectional utilization as in the case of cable lifts and, consequently, the existing space can be efficiently used for lifts in a building or can be considerably reduced during the planning of new buildings.

With the aid of the linear motor drive according to the invention, a high carrying capacity can be achieved as a result of the achievable higher speed and, in addition, as a result of the use of a plurality of lift cars in one lift shaft. In this connection, a circulating operation of the lift cars is particularly effective, one lift shaft being used for the upward journey and a second shaft for the downward journey.

It is of advantage if the linear motor comprises a plurality of rows, disposed at a distance from one another, of stator windings which are each disposed between exciter magnet rows situated mutually opposite. In this way, the motor force can be multiplied with the same motor height and virtually the same motor volume.

According to the invention, provision can be made that two exciter magnet rows are assigned in each case to each stator winding, which rows are positioned on the front or rear, respectively, of the stator winding. If, however, a plurality of stator windings disposed at a distance from one another are used, there may be disposed between two adjacent stator winding rows only one exciter magnet row, whose north and south poles are situated opposite the stator windings. In this way, the construction of the central exciter can be simplified and the weight reduced somewhat.

The exciter magnets may be designed, for example, in the form of electromagnets. Since, however, an additional voltage supply and corresponding supply cables are necessary for this purpose, it is particularly advantageous if the exciter magnets are designed as permanent magnets.

It is of advantage if the stator windings, i.e. the primary coils of the linear motor, are surrounded by a nonmagnetic casing. As a result, a particularly robust construction is achieved without the magnetic field pattern being influenced by the casing. The casing can be produced, for example, by a plastics material encasing of the primary coils.

In some cases, if the construction is particularly heavily loaded, it may be advantageous to support the stator windings with additional holding elements attached to a stator support.

In a preferred construction, the stator winding rows are mounted on rod-type holding elements made of nonmagnetic material. Because of the rod-type design, the mass required to stabilize the stator windings can be kept very low. The use of a nonmagnetic material has the result that the pattern of the magnetic field is determined only by the design of the stator windings and the exciter magnets, but not by the existence of additional holding elements.

The holding elements can be fixed to a stator support which can be fixed to an internal wall of the lift shaft or to the lift car. Thus, for example, provision can be made that the stator support is attached to a side wall of the lift shaft and the stator windings project from the latter and are aligned perpendicularly to the wall of the lift car.

It is beneficial if the stator windings assigned to the different phases mutually overlap.

An advantageous embodiment is notable for the fact that the stator winding row can be divided up into short segments which can be movably mounted. This makes possible a design in which the lift car can also be propelled horizontally.

In this connection, it is of advantage if a switchpoint can be formed by means of movable stator segments, i.e. the segments of the stator winding row.

It is beneficial if the stator windings form essentially flat pole faces.

In a particularly preferred embodiment of the linear motor according to the invention, provision is made that the pole faces of the stator windings are wider than the pole faces of the exciter magnets. The arrangement of the stator windings between two mutually oppositely situated exciter magnet rows makes it possible in this case to drive the lift car round gentle bends in the plane parallel to the pole faces of the stator windings, that is to say laterally or in the depth direction depending on the orientation of the pole faces, without an additional frame being necessary. In this way, curved travel of the lift car can also be achieved, for example, a transition from vertical travel to horizontal travel.

While no additional field guides are necessary for the stator windings because of their arrangement according to the invention and they can therefore be of iron-free design, it is advantageous if the externally situated exciter magnets situated opposite only on one side of a stator winding row are joined together by means of yokes on their side remote from the stator windings. This makes possible a return of the magnetic field.

However, if a plurality of rows, disposed mutually at a distance, of stator windings is used, yokes of this type are advantageously provided only for the externally situated exciter magnets on their sides remote from the stator windings. For the exciter magnets positioned between two adjacent stator windings, such yokes are unnecessary since the magnetic field extends rectilinearly through said exciter magnets. As a result of the division into a plurality of stator windings disposed mutually at a distance, iron mass can therefore be eliminated at the exciter and, consequently, a particularly high carrying capacity can be achieved.

A further mass saving and weight saving can be achieved in that the material thickness of the yokes in the region between two adjacent exciter magnets is greater than at the exciter magnets. The material thickness of the yokes is therefore matched to the magnetic flux which occurs. The latter is particularly high between two adjacent exciter magnets, whereas it assumes lower values at the exciter magnets.

The yokes are advantageously mounted on nonmagnetic supports.

The supports may be made, for example, of aluminium or of a composite material. The field pattern is not impaired by the supports and, at the same time, a very high mechanical robustness of the supports can be achieved by a suitable profile formation, known to the person skilled in the art, of the supports even if relatively low masses are used.

To design a linear-motor-driven lift, the supports can be fixed to the lift car or to the internal wall of the lift shaft. Thus, for example, provision can be made that two supports can each be fixed mutually at a distance to a side wall of the lift car to mount the yokes on which the externally situated exciter magnet rows are in turn fixed. Between the supports disposed mutually at a distance, there may project perpendicularly from the side wall of the lift car ferromagnetic metal sheets on which the exciter magnet rows positioned between two adjacent stator windings are mounted. Stator windings oriented with their pole faces parallel to the exciter magnet rows can in turn project perpendicularly from a stator support which is mounted on the oppositely situated wall of the lift shaft.

A linear motor of this type may be provided on both sides of the lift car.

Instead of disposing the stator windings on the wall of the lift shaft and the exciter magnets on the lift car, provision may also be made for fixing the exciter magnets to the shaft wall and for attaching the corresponding stator windings to the lift car.

The linear motor according to the invention may be used both for the direct drive of the lift car and for cable lifts with counterweight. In this connection, it is possible to dispose the stator windings on the counter weight and the exciter magnets on the lift shaft. However, a reverse arrangement is also possible in which the stator windings are fixed to the lift shaft wall and the exciter magnets to the counterweight. of course, the lift car can likewise be directly driven even in the case of lifts with counterweight by disposing the linear motor between lift car and shaft wall.

As already mentioned, the exciter magnets may be designed either as electromagnets or as permanent magnets. A construction is also conceivable in which a combination of magnets of these types is used.

The linear motor according to the invention can be disposed on one side between a lift shaft wall and the corresponding side wall of the lift car or—particularly preferably—on two mutually opposite sides of the lift car. In addition, it can be positioned in the form of a rucksack suspension between the rear wall of the lift car and the rear wall, adjacent to the latter, of the lift shaft.

The pole faces of the stator windings and also the corresponding exciter magnets may be aligned either perpendicularly to or parallel to the lateral shaft walls. As already described above, depending on the orientation of the pole faces of the stator windings, a lateral or back-wall curve travel of the lift car can be achieved with the aid of the linear motor according to the invention.

For curve travel of the lift car, it is of particular advantage if the stator windings of a row are mutually joined in a movable manner. In this case, movable switch-point blades may also be implemented, which makes possible a transfer of lift cars from one lift shaft to another.

In a particularly preferred design, provision is made that the stator winding row can be fixed to the internal wall of the lift shaft and each stator winding extends in the vertical direction over a section which is longer than the overall height of the exciter magnets on the lift car. As a result, a good efficiency can be achieved by designing only those stator windings to be current-carrying inside which the lift cabin is situated.

The description below of a preferred embodiment of the invention serves for the more detailed explanation in conjunction with the drawing.

BRIEF DESCRIPTION OF THE DRAWINGS

FIG. 2 shows a diagrammatic plan view of a linear motor used to drive the lift car in FIG. 1;

FIG. 3 shows a cross-sectional view along the line 3—3 in FIG. 2;

DETAILED DESCRIPTION OF THE INVENTION

Figure 1:
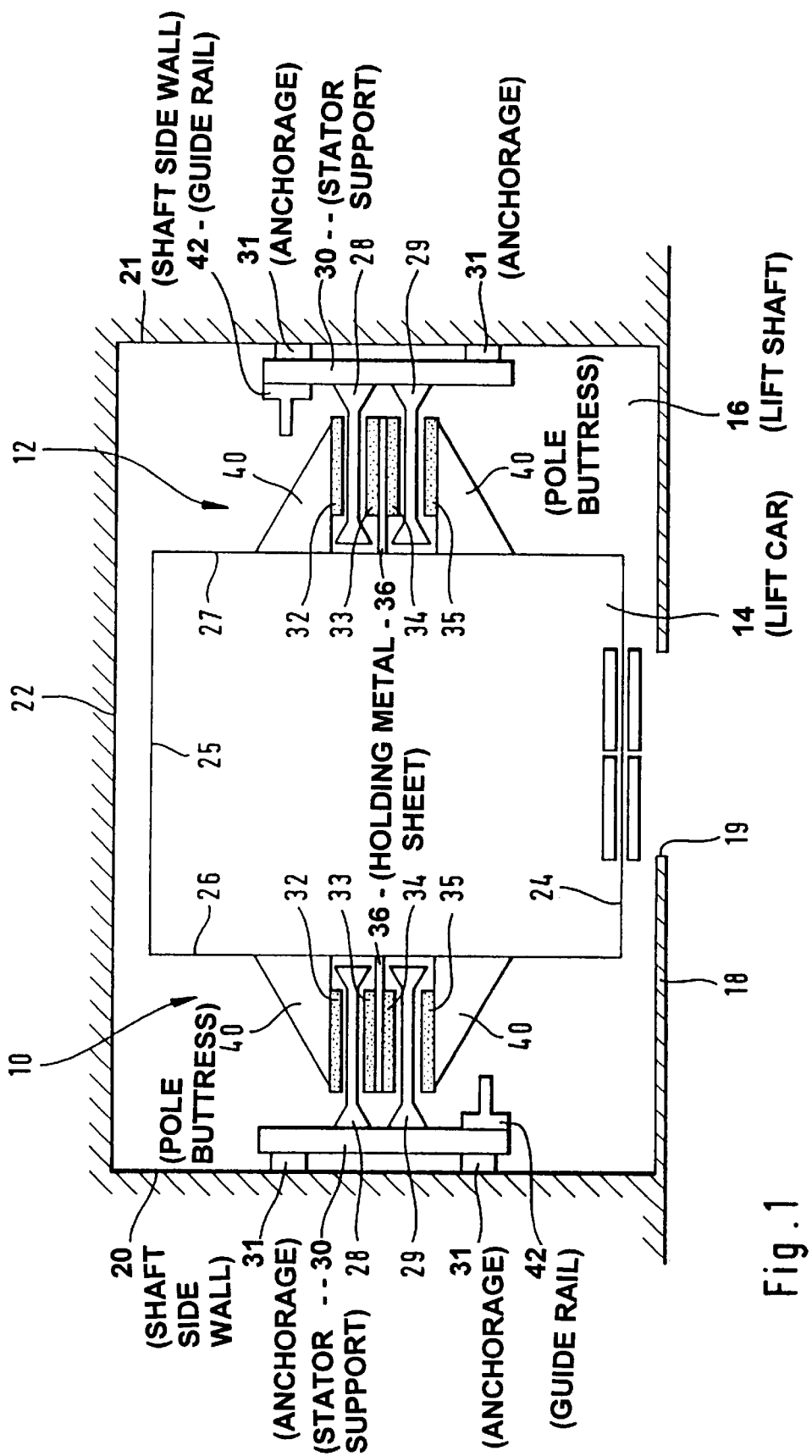
FIG. 1 shows a diagrammatic plan view of a lift car with linear motors according to the invention.

FIG. 1 shows a lift car 14 which is directly driven by means of identically designed synchronous linear motors 10 and 12 and which can be driven in a lift shaft 16. The latter comprises a front wall 18 having an opening 19, side walls 20 and 21 extending transversely to the front wall 18 and also a rear wall 22 aligned parallel to the front wall. The lift car 14 disposed centrally in the lift shaft 16 likewise has a front wall 24 and a rear wall 25, which are disposed parallel to the corresponding front and rear walls 18 and 22, respectively, of the lift shaft, and also side walls 26 and 27 which extend at a distance from the corresponding side walls 20 and 21, respectively, of the lift shaft 16. A linear motor 10 or 12, respectively, is disposed in each case between the side walls of the lift car 14 and of the lift shaft 16.

The linear motors 10 and 12 are of identical design and in each case comprise two rows, extending along the lift shaft, of stator windings 28 and 29 which are disposed at a distance and mutually in parallel and project perpendicularly from a stator support 30 which is mounted by means of anchorages 31 on the side wall 20 or 21, respectively, of the lift shaft 16. The pole faces of the stator windings 28, 29 are aligned transversely with respect to the side walls 20 and 21. The stator winding rows 28 and 29 are each situated opposite permanent magnet rows 32 and 33 or 34 and 35, respectively, on both sides at a distance in the form of an air gap 37, the permanent magnet rows 33 and 34 positioned between the stator windings 28 and 29 being fixed to the mutually remote outsides of a holding metal sheet 36, while the externally situated permanent magnet rows 32 and 35 situated opposite only on one side of a stator winding row 28 and 29, respectively, are mounted on their outside remote from the stator windings by means of yokes 38 shown in FIGS. 2 and 3 on pole buttresses 40 which project perpendicularly from the side walls 26 and 27 of the lift car 14.

To drive the lift car 14, a travelling magnetic field is generated in a manner known per se in the stator winding rows 28 and 29. This has the result that, because of the permanent magnet row 32 to 35, a thrust force is exerted in the vertical direction on the lift car 14. The permanent magnets 32 to 35 therefore form the exciter magnets of the linear motors 10, 12, and the stator windings 28, 29 are the primary coils.

In addition to the stator windings 28 and 29, there is mounted on the stator support 30 a guide rail 42 which interacts with guide rollers not shown in the drawing, known per se and disposed on the lift car 14 to guide the lift car 14 inside the lift shaft 16.

The linear motor 10 is shown enlarged in FIGS. 2 and 3. As is evident from FIG. 3, a multiplicity of permanent magnets is arrayed on both sides in each case in a vertical direction along the stator winding rows 28 and 29, the permanent magnets of the externally situated permanent magnet rows 32 and 35, respectively, each being mutually joined by means of the yokes 38 and mounted on pole buttresses 40. In contrast, the central permanent magnet rows 33 and 35 positioned between the stator winding rows 28 and 29 do not have any assigned yokes, but on the contrary, are attached directly to the holding metal sheet 36, which is made of a ferromagnetic material. The material thickness of the yokes 38 is relatively high between two adjacent permanent magnets and decreases in each case in the direction of the permanent magnets. The yokes 38 are mounted on the side walls 26 and 27, respectively, of the lift car 14 by means of the pole buttresses 40. In order not to impair the pattern of the magnetic field, the pole buttresses are made of a nonmagnetic material, for example of aluminium profiled sections or light composite materials. The strong normal forces generated by the magnetic field at the outer row of permanent magnets 32 and 35 are compensated for by means of the pole buttresses 40. In contrast, virtually no horizontal forces occur at the stator windings 28 and 29. In order to impart a high mechanical robustness to them, they are each embedded in a casing 43 which does not comprise any constituents made of ferromagnetic material. The casing 43 is beneficially produced by a smooth encasing of the coils with a plastics material or plastic resin layer which can be reinforced in a simple manner by means of fibres.

The magnetic field pattern occurring in the case of the linear motors 10 and 12 is shown by way of example in FIGS. 2 and 3 by a field line 44. Because of the parallel arrangement of the permanent magnet rows 32 to 35 and the stator windings 28 and 29 disposed between the permanent magnet rows, a field pattern is generated in which the field lines pass perpendicularly and rectilinearly through the permanent magnets and the stator windings. Since the stator windings 28 and 29 are of iron-free design, virtually no transverse forces occur between the permanent magnet rows and the stator windings, and the stator windings 28 and 29 have only a relatively low weight.

In principle, electromagnets could also be used instead of the permanent magnets as exciter magnets for the linear motors 10 and 12. The use of permanent magnets makes it possible, however, to design the air gaps 37 between the permanent magnets and the stator windings with the size necessary for the conventional roller guide without additional energy expenditure.

Since, in the case of the present linear motors 10 and 12, the permanent magnets positioned between the stator windings 28 and 29 are mounted directly on the ferromagnetic holding metal sheet 36, they do not require a yoke since the magnetic field extends rectilinearly in this region through the corresponding permanent magnets. A yoke 38 is necessary on each of the externally situated permanent magnet rows 32 and 35 only for the return of the magnetic field, an iron material being used for the yoke 38. As a result of the use of a plurality of stator windings which are disposed mutually at a distance and between which permanent magnets are positioned in each case, iron mass can therefore be eliminated in the case of the linear motors 10 and 12 according to the invention. A greater carrying capacity can therefore advantageously be achieved by disposing a plurality of stator windings alongside one another. In contrast, an increase in the pole area of the stator windings would have the result that more yoke mass would be needed and that, in addition, the normal forces would increase. This would in turn make it necessary to make the pole buttresses 40 of more robust and therefore also of heavier design.

As already described, the yokes 38 are of thinner design at the positions of lower magnetic flux, that is to say at the permanent magnets, than between two adjacent permanent magnets. This likewise results in an elimination of mass and weight.

As emerges, in particular, from FIG. 3, the pole buttresses 40 are each disposed directly behind the permanent magnets. Alternatively, the pole buttresses 40 could also be positioned in each case between two adjacent permanent magnets at the thicker regions of the yokes 38. In the case of the construction shown in the drawing, however, the yokes 38 can be attached to the pole buttresses 40 in a particularly simple manner, for example by firmly screwing.

Figure 4:
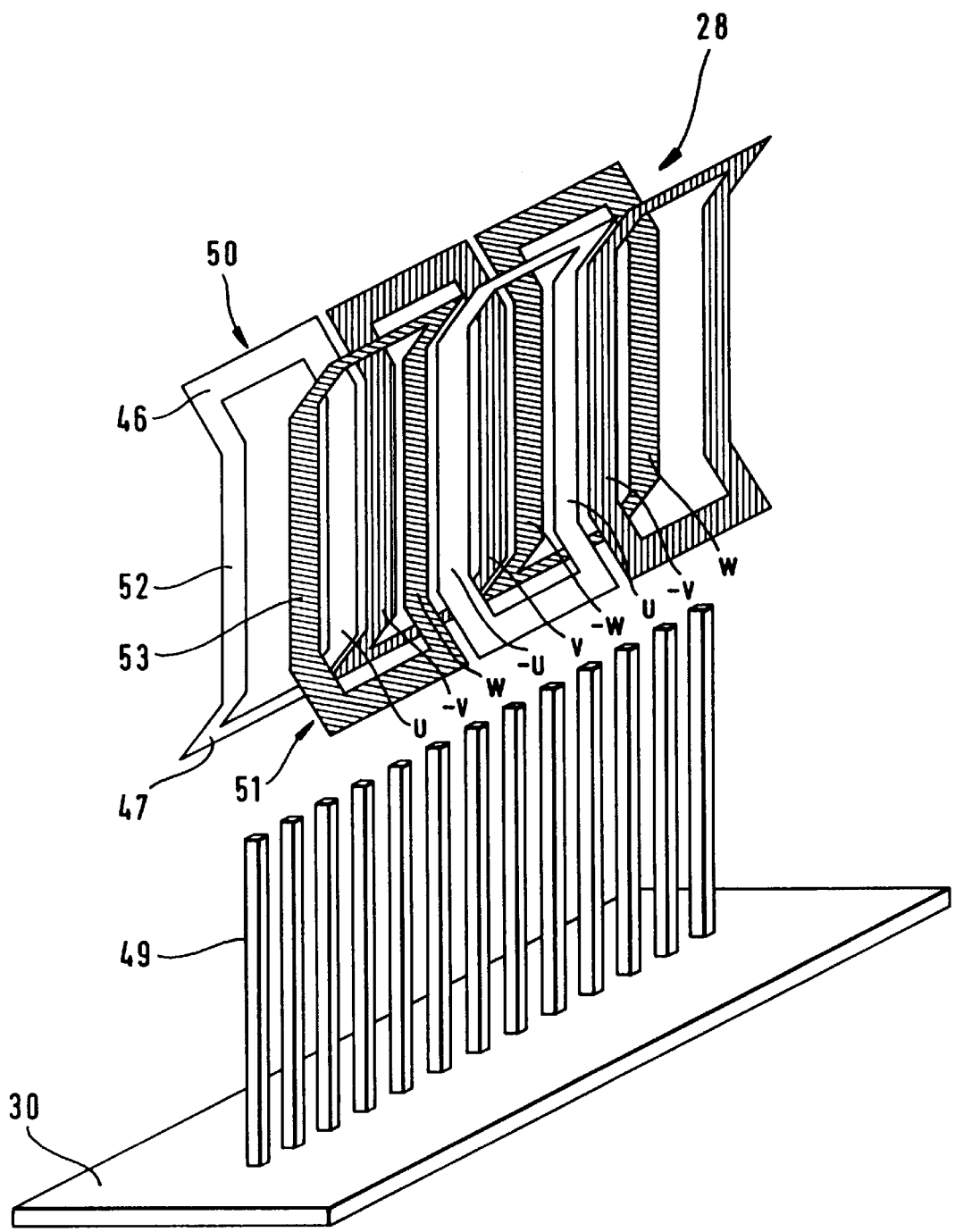
FIG. 4 shows a diagrammatic, perspective view of a stator winding row in the disassembled state.

The two stator winding rows 28 and 29 are of identical design. A vertical section of the stator winding row 28 is shown diagrammatically in FIG. 4. The row comprises in each case a multiplicity of windings arrayed along the lift shaft 16 for the individual three phases of the supply. These are indicated in FIG. 4 by the symbols u, v and w. In each case, two adjacent windings 50, 51 are situated mutually opposite and overlap in the vertical direction in such a way that the filaments 52 and 53 of the windings are essentially in one plane. The windings consequently extend essentially in one plane, i.e. the pole faces of the stator winding rows 28 and 29 are each of laminar design. Only the winding heads 46 and 47 extending parallel to the stator support 30 are spread out to the side. Between the central filaments 52 and 53, aligned transversely to the stator support 30, of the mutually oppositely situated windings 50 and 51 engage in the embodiment shown in FIG. 4 in order to support holding rods 49 which are made of a nonmagnetic material and which are mounted on the stator support 30 and project perpendicularly from it. To achieve a better visibility, the windings of the individual three-phase supply u, v and w are shown in FIG. 4 at a distance from the holding rods 49.

The windings may, however, be mounted even without the use of the holding rods 49. If the windings are arranged without holding rods, the efficiency can be increased by reducing the distance between the windings. In this case, the design of the housing 43 or the encasing of the windings is carried out in such a way that an adequate robustness of the stator winding row and a good force transmission from the stator windings to the stator support 30 is ensured. This can be achieved, for example, by encasing the windings and, in particular, the winding heads with a layer of fibre-reinforced plastics material and a screw joint and/or denticulation with the stator support 30 which is, for example, perforated. In this connection, an adequate attachment is further promoted in that widened winding heads rest in each case against the stator support 30.

Alternatively, instead of three current phases, only two phases may also be used. This results in a simpler production of the stator winding row and also a simpler assembly. Furthermore, the winding heads in the case of a two-phase winding are narrower than in the case of a three-phase one. Together with a corresponding air gap width, it is possible in this case to pull out the stator windings laterally from the gaps between the permanent magnets. This is advantageous for the assembly or disassembly of the lift car or of the drive. The two-phase winding can just as easily be broken up into segments as the three-phase winding, as is described below by reference to FIG. 5.

Figure 5:
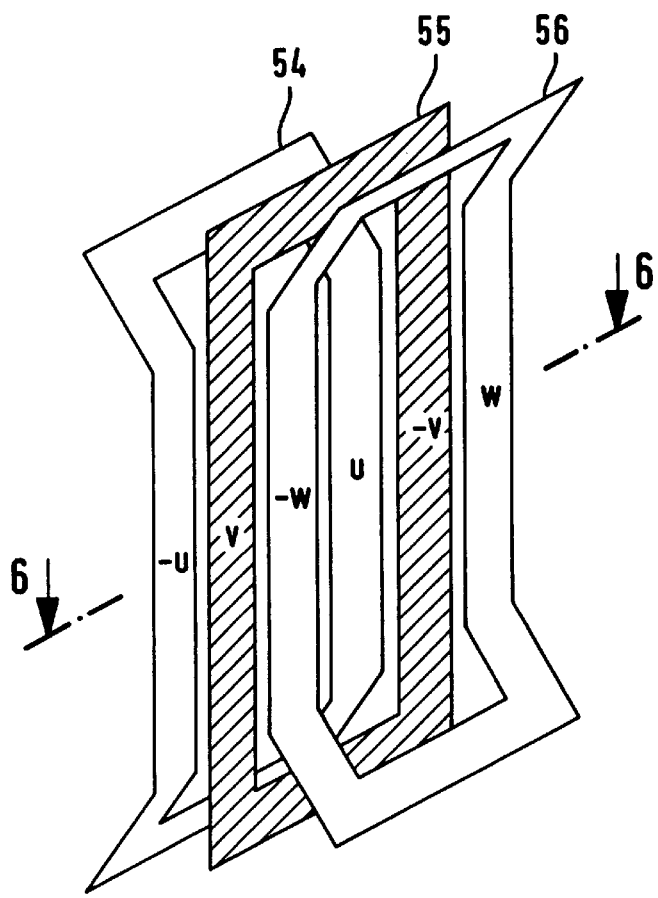
FIG. 5 shows a diagrammatic, perspective view of an alternative arrangement of the stator winding row

FIG. 5 shows diagrammatically an alternative arrangement of a three-phase stator winding. In this arrangement, the windings overlap in such a way that the filaments of three adjacent windings 54, 55, 56 cover the pole faces without a gap. The stator windings can be broken down into small segments in this arrangement. The length of said segments is double the pole division.

Figure 6:
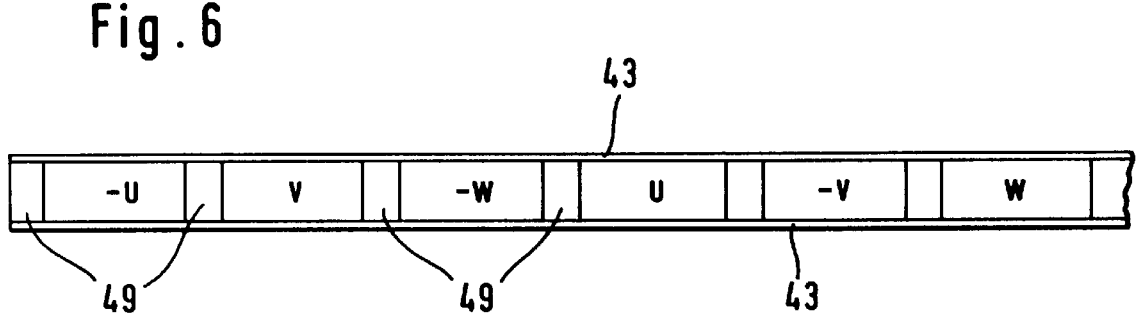
FIG. 6 shows a sectional view along the line 6—6 in FIG. 5.

FIG. 6 shows a section through the winding arrangement according to FIG. 5, the windings 54, 55, 56, being mounted, as described above by reference to FIG. 4, on the holding rods 49 and being surrounded by the casing 43. Here it can be seen that the filaments of the windings corresponding to the phases u, v and w are disposed without a gap in one plane and, as a result, permit the smallest possible segmentation of a three-phase winding.

In the case of the linear motors 10 and 12 shown in FIGS. 1 to 3, the pole faces of the stator winding rows 28 and 29 extend perpendicularly to the side walls 26 and 27 of the lift car 14. However, a construction rotated through 90° through a vertical axis is also conceivable, in which construction the pole faces extend parallel to the side walls 26 and 27.

The linear motors 10, 12 according to the invention have the advantage that the magnetic field of the motor is not altered by the movement of the lift car 14. Virtually no forces act horizontally on the stator carrier 30 and only static forces act on the pole buttresses 40. The linear motors 10 and 12 furthermore do not have any groove locking moments. Consequently, the thrust force is very homogeneous and essentially no noise is produced. Since the stator windings 28 and 29 contain no iron material, they can also not exert any forces perpendicularly to the pole face. Fairly small normal forces are produced only by stray fields at the winding heads 46 and 47 and at the magnet ends. These small forces can, however, easily be compensated for by conventional roller guides of the lift car 14. In contrast, substantial normal forces are brought about by stator windings involving iron.

The linear motors 10 and 12 according to the invention have, in addition, the advantage that no moments act laterally on the stator windings 28 and 29. On the contrary, bending moments occur only in the thrust direction, i.e. in the vertical direction. In this direction, the linear motors 10 and 12 have, however, their greatest robustness. It is advantageous, in addition, that virtually no noise is produced by magnetostriction.

What is claimed is:

1. A linear motor for driving a lift car guided in a lift shaft, comprising:
   at least one stator winding row which is fixable to one of said lift shaft and lift car;
   at least one row of exciter magnets of alternating polarity which are situated at a distance opposite stator windings of the stator winding row and which are fixable to the other of the lift car and lift shaft;
   wherein the stator windings are iron-free and are disposed between two exciter magnet rows which are situated opposite to each other.

2. A linear motor according to claim 1, wherein the linear motor comprises a plurality of rows, disposed at a distance from one another, of stator windings which are each disposed between exciter magnet rows which are situated opposite to each other.

3. A linear motor according to claim 2, wherein only one row of exciter magnets is disposed between two adjacent stator winding rows, the north and south poles of said exciter magnets being situated opposite the stator windings.

4. A linear motor according to claim 2, wherein the exciter magnet rows disposed between adjacent stator winding rows are mounted on a mounting made of ferromagnetic material.

5. A linear motor according to claim 4, wherein the mounting is designed as a ferromagnetic holding metal sheet.

6. A linear motor according to claim 1, wherein the exciter magnets comprise permanent magnets.

7. A linear motor according to claim 1, wherein the stator windings are each surrounded by a nonmagnetic casing.

8. A linear motor according to claim 1, wherein the at least one stator winding row is mounted on rod-type holding elements made of nonmagnetic material.

9. A linear motor according to claim 8, wherein the holding elements are fixed to a stator support which can be fixed to an internal wall of one of the lift shaft and lift car.

10. A linear motor according to claim 1, wherein the stator winding row is dividable into short segments which are movably mountable.

11. A linear motor according to claim 10, wherein a switchpoint is formable by means of movable stator segments.

12. A linear motor according to claim 1, wherein stator windings assigned to different phases mutually overlap.

13. A linear motor according to claim 1, wherein the stator windings form essentially flat pole faces.

14. A linear motor according to claim 1, wherein external exciter magnets, which are situated opposite to a stator winding row on only one side thereof, are joined together by means of yokes on sides thereof remote from the stator windings.

15. A linear motor according to claim 14, wherein the material thickness of the yokes in a region between two adjacent exciter magnets is greater than at the exciter magnets.

16. A linear motor according to claim 14, wherein the yokes are mounted on nonmagnetic supports.

17. A linear motor according to claim 16, wherein the supports are made of aluminum or of a composite material.

18. A linear motor according to claim 16, wherein the supports can be fixed to the lift car or to the internal wall of the lift shaft.

19. A lift having a lift car which can be driven in a lift shaft, wherein the lift comprises at least one linear motor according to claim 1 for driving the lift car.

20. A lift according to claim 19, comprising a drive having two of said linear motors which are each disposed between a side wall of the lift car and a corresponding side wall of the lift shaft.

21. A lift according to claim 19, wherein:

the lift car is driveable in a curve along the lift shaft; and pole faces of the stator windings are wider in a region of the curve than pole faces of the exciter magnets.

22. A lift according to claim 19, wherein:

the lift is provided with a counterweight; and the at least one linear motor is disposed between at least one of (i) the counterweight and corresponding shaft walls and (ii) the lift car and corresponding shaft walls.

\* \* \* \* \*